(12) United States Patent
Nehmadi et al.

(10) Patent No.: US 9,303,989 B2
(45) Date of Patent: Apr. 5, 2016

(54) SYSTEM AND METHOD FOR PROVIDING 3D IMAGING

(75) Inventors: Youval Nehmadi, Nili (IL); Hugo Guterman, Beer Sheva (IL)

(73) Assignee: Ben-Gurion University of the Negev, Beer Sheva (IL)

( * ) Notice: Subject to any disclaimer, the term of this patent is extended or adjusted under 35 U.S.C. 154(b) by 576 days.

(21) Appl. No.: 13/580,927

(22) PCT Filed: Feb. 22, 2011

(86) PCT No.: PCT/IL2011/000180
§ 371 (c)(1),
(2), (4) Date: Aug. 23, 2012

(87) PCT Pub. No.: WO2011/104706
PCT Pub. Date: Sep. 1, 2011

(65) Prior Publication Data
US 2012/0314037 A1    Dec. 13, 2012

Related U.S. Application Data

(60) Provisional application No. 61/282,517, filed on Feb. 23, 2010.

(51) Int. Cl.
*G01C 11/06*       (2006.01)
(52) U.S. Cl.
CPC ...................... *G01C 11/06* (2013.01)
(58) Field of Classification Search
USPC ........................................................ 382/154
See application file for complete search history.

(56) References Cited

U.S. PATENT DOCUMENTS

| 8,187,097 | B1* | 5/2012 | Zhang | 463/37 |
| 2002/0139920 | A1* | 10/2002 | Seibel et al. | 250/208.1 |
| 2007/0282506 | A1* | 12/2007 | Breed et al. | 701/45 |

OTHER PUBLICATIONS (Sung-Yeo Kim, "Depth Map Creation and Mesh-based Hierarchical 3-D Scene Representation in Hybrid Camera System"; 2008;http://imaging.utk.edu/people/former/sykim/paper/PhD_Thesis_sykim.pdf).*

(Francois De Sorbier, "Depth Camera Based System for Auto-Stereoscopic Displays", 2010; http://ieeexplore.ieee.org/stamp/stamp.jsp?tp=&arnumber=5662047).*

* cited by examiner

*Primary Examiner* — Siamak Harandi
(74) *Attorney, Agent, or Firm* — Venable LLP; Jeffri A. Kaminski

(57) ABSTRACT

The present invention relates to a system and method for providing 3D imaging. The system comprises: a) two or more cameras for allowing to generate stereoscopic information only for selected regions in a common or coincident field of view captured simultaneously by both of said two cameras, in order to provide distance measurements information to object(s) located in said selected regions; b) at least one 3DLR module for providing 3D image, wherein said two cameras and said 3DLR module are positioned in such a way that, at least partially, they will be able to capture similar or coincident field of view information; and c) a processing unit for generating said 3D imaging according to said stereoscopic information and said 3D image by using image processing algorithm(s) in order to provide 3D imaging information in real-time.

13 Claims, 13 Drawing Sheets

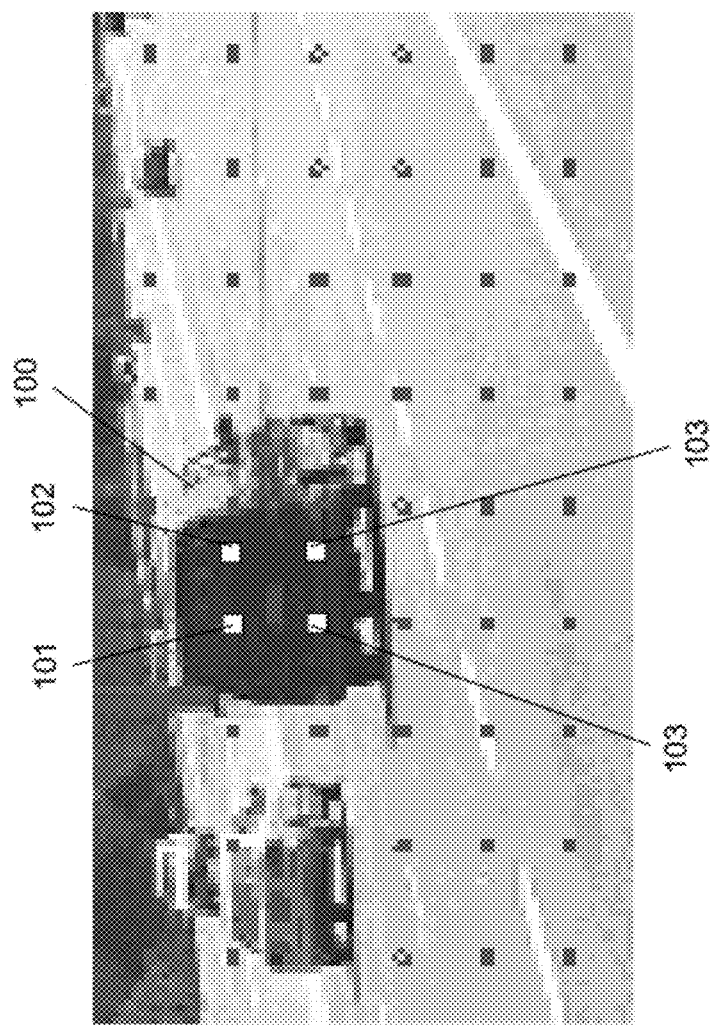

SYSTEM AND METHOD FOR PROVIDING 3D IMAGING

FIELD OF THE INVENTION

The present invention relates to the field of 3D imaging systems. More particularly, the invention relates to a method and system for the combining of stereovision and Time-Of-Flight (TOF) information for providing an enhanced 3D imaging.

BACKGROUND OF THE INVENTION

Acquiring 3D (three-dimensional) information is important for different types of applications such as autonomous vehicles, mapping aerial imaging, user interaction with computers (e.g. computer games), the movie industry (e.g., removing background), etc. In order for a vehicle to navigate autonomously, similarly to a human driver, an autonomous vehicle needs to understand the 3D world around it. The vehicle needs to know what the road "looks like"; it must identify how far the next junction is, whether there are obstacles around it, whether there are pedestrians or other vehicles approaching it, etc. All this has to be done in real time while driving under various road conditions. In addition a system that acquires the 3D information for enabling automatic navigation must be able to work at a distance and speed that allows enough time for the vehicle to respond.

During the last decade the field of autonomous vehicles has gained strategic importance and widespread relevance. Many projects were launched worldwide aimed at analyzing the problem of people's mobility and goods transportation from a number of different perspectives. During the last few years, the first prototypes of vehicles equipped with automatic driving facilities and road infrastructures supporting these functionalities, have been tested and demonstrated to the public. For the vehicle to navigate autonomously the vehicle needs to behave like a driver and must understand the 3D world around him. Furthermore the vehicle needs to know what the road looks like, be able to identify how far the next junction is, see whether there are obstacles around him, recognize whether there are pedestrians or other vehicles approaching him, etc. Using 3D information enables the robot or autonomous vehicle to detect obstacles and to avoid them, to recognize the objects, to map the environment and to select its route.

Today, there are two practical technologies available for acquiring 3D images: a) stereo vision methodologies; and b) using Range Laser Sensors which employ Time-Of-Flight (TOF) techniques to measure distance. Both technologies have been used separately and in combination, but, unfortunately they have failed to provide a robust solution when applied to autonomous vehicles.

Similar to human vision, stereo vision uses at least two views of the same object to measure distance. To calculate distance, it is necessary to identify similar objects or points with high resolution in the simultaneously captured frames. Then, by measuring the distance between the cameras and their angle to the object, the distance to the object can be estimated. Common limitations of this technique are: the amount of computation needed in order to find the similar objects and to make the calculations, the errors that occur when there is no pattern or duplicated object on the surface, the limited accuracy that is the result of the distance between the cameras and the pixel size, and the sensitivity to light conditions and texture.

The existing range sensors technology that supports autonomous vehicles today employs TOF detector to measure distance. The TOF methodology usually operates as follows: A light pulse is emitted by a laser diode. The light travels until it hits a target, and a portion of the light's energy is reflected back towards the emitter. A detector located near the emitter detects the returning signal and calculates the time difference between the time the laser emitted the pulse and the time when the pulse was detected. This time difference determines the distance of the target. In order to capture a 3D image, the laser pulse is directed each time to a different angle. Based on the directions the laser was directed to, an array or a matrix of distance measurements is generated. The assembly of these measurements composes a 3D distance image. Although this technology is widely used for research and prototyping in autonomous vehicles, it suffers both from high price and from low reliability due to components that move during the scanning. It is also susceptible to crosstalk and noise.

To address these problems and to provide real-time 3D information for autonomous vehicle navigation, enhanced imaging tools are required.

It is an object of the present invention to provide a system which is capable of combining 3D low resolution image capturing technique and stereoscopy technique as complementary methods and provide higher resolution 3D images It is an object of the present invention to provide a safe and reliable solution for autonomous vehicles.

Other objects and advantages of the invention will become apparent as the description proceeds.

SUMMARY OF THE INVENTION

The present invention relates to a system for providing 3D imaging, which comprises: a) two or more cameras for allowing to generate stereoscopic information only for selected regions in a common or coincident field of view captured simultaneously by both of said two cameras, in order to provide distance measurements information to object(s) located in said selected regions; b) at least one 3DLR module for providing 3D image, wherein said two cameras and said 3DLR module are positioned in such a way that, at least partially, they will be able to capture similar or coincident field of view information; and c) a processing unit for generating said 3D imaging according to said stereoscopic information and said 3D image by using image processing algorithm(s) in order to provide 3D imaging information in real-time.

According to an embodiment of the present invention, the system further comprises an IR camera for allowing correlating between the measurements of the 3DLR module with the images provided from the two cameras, wherein the correlation is based on a matching algorithm.

According to some embodiments of the present invention, the 3DLR module is a laser range finder unit configured to provide 3D range image using laser and a scanning system.

According to an embodiment of the present invention, the 3DLR module comprises a receiver, a light emitting unit and a processing unit. For example, the receiver of 3DLR may comprises an array of receiving units each of which sensitive to light or to IR, a threshold circuit, a memory unit and at least one counter. In some embodiments, the 3DLR module may further comprises a polarizer for avoiding crosstalk between vehicles coming from the opposite directions.

According to an embodiment of the present invention, the two cameras and the 3DLR module are located on the same imaginary plane facing the same direction.

According to an embodiment of the present invention, the system further comprises optic alignment means (e.g., a beam splitter) for allowing to match pixels between the images provided from the 3DLR module and from the two cameras, by allowing to separate the light into its different wavelengths, in such a way that the wavelengths required for distance measurements will be sent to said 3DLR module and the rest of the wavelengths will be sent to the CCD sensor of each of said two cameras.

The present invention further relates to a TOF module provided with non-moving parts for providing the 3D image, which comprises: a) a receiver; b) a light emitting unit; and a processing unit. The TOF module may further comprises polarizing means for avoiding crosstalk phenomena between vehicles coming from opposite directions, wherein said polarizing means are configured to work with structured light or any other device that emit light and have a sensor that measure the reflected light. According to an embodiment of the present invention, the polarizer means comprises two units, wherein the first unit is attached to the light emitting unit and the second unit is attached to the receiver.

The present invention further relates to a method for providing 3D imaging, which comprises the steps of: a) capturing images from at least two cameras for allowing to generate stereoscopic information only for selected regions in a common or coincident field of view which is captured simultaneously by both of said cameras, in order to provide distance measurements information to object(s) located in said selected regions; b) generating low resolution 3D image data by a 3DLR module, wherein said two cameras and said 3DLR module are positioned in such a way that, at least partially, they will be able to capture similar or coincident field of view information; and c) generating said 3D imaging according to said stereoscopic information and said 3D image by using image processing algorithm(s) in order to provide 3D imaging information in real-time.

According to an embodiment of the present invention, the selected regions are determined by correlating the 3D image data only with the corresponding image captured by one of the cameras, in order to identify regions in said 3D image that the 3DLR module is unable to properly distinguish in a given field of view.

According to an embodiment of the present invention, the stereoscopic information is generated by correlating between the images provided by the two cameras using a real-time matching algorithm. According to some embodiments of the present invention, the correlation between the data provided by the 3DLR module with the stereoscopic information is done by an optic alignment means.

The method may further comprises the steps of: a) creating an array or matrix of TOF measurements using the 3DLR module; b) performing real time stereoscopy by using a matching algorithm thereby providing stereoscopy data; and c) combining said TOF measurements and said stereoscopy data for creating a high resolution 3D imaging.

BRIEF DESCRIPTION OF THE DRAWINGS

In the drawings:

FIG. 11 is a composed image of high and low resolution information;

DETAILED DESCRIPTION OF PREFERRED EMBODIMENTS

Figure 1:
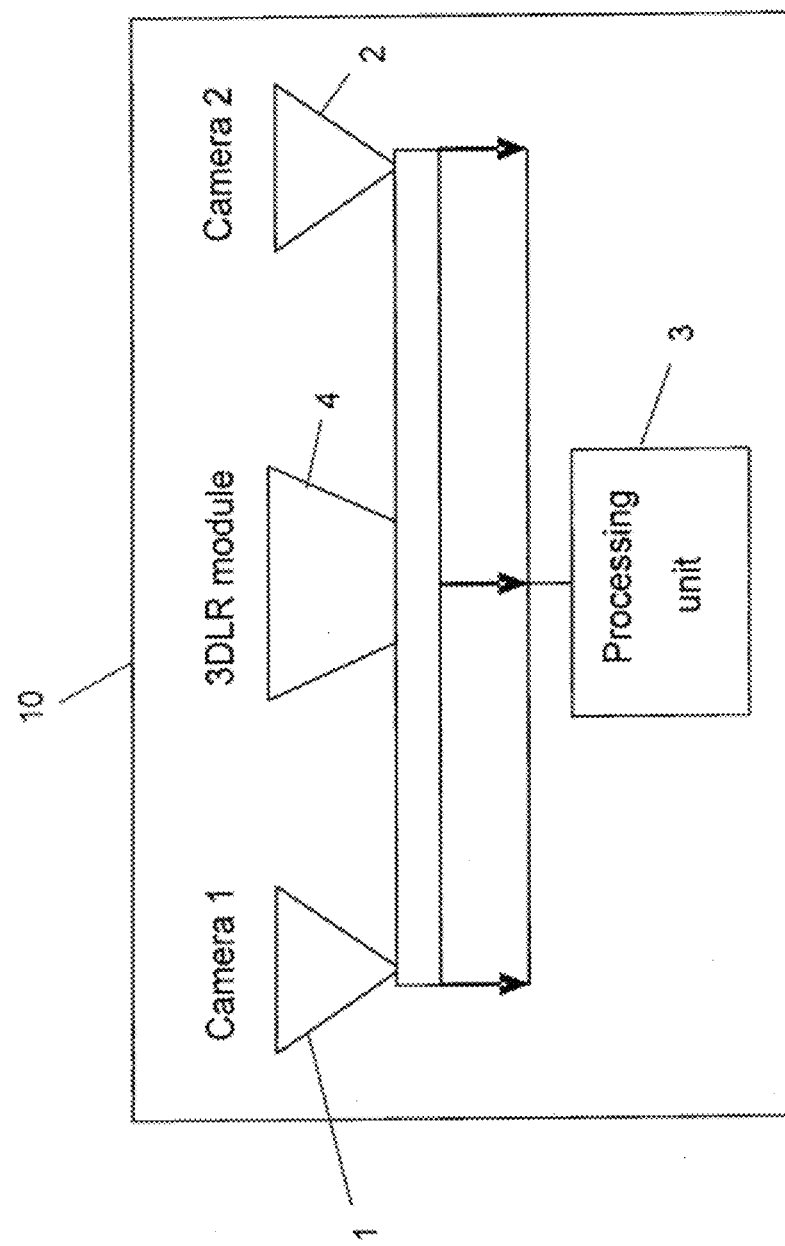
FIG. 1 schematically illustrates a system which combines a TOF module and a stereovision module, according to an embodiment of the present invention.

The term "stereoscopy" refers herein to a technique for creating a depth image (i.e., 3D image) by using two offset images separately.

The term "3D Low Resolution" (3DLR) refers herein to a technique for capturing a low resolution 3D image by using a camera module or other imaging technology that creates distance data as an example Time-Of-Flight (TOF) or structured light principles, etc. A low resolution 3D image refers herein to a 3D image with a relatively limited amount of pixels in the field of view (e.g., 4 pixels may represent a detailed object such as a vehicle).

In order for the system to navigate a vehicle autonomously (or other robotic mechanisms), similar to a human driver, the system needs to understand the 3D world around it. The system needs to know what the road looks like, identify how far the next junction is, whether there are obstacles around the vehicle, whether there are pedestrians or other vehicles approaching it, etc. All this needs to be done in real time during driving under various road conditions. The system of the present invention is configured to acquire 3D information in order to enable automatic navigation at a distance and speed that enables enough time for the vehicle (or other robotic mechanism) to respond. Therefore, the system configuration is based on the following capabilities or conditions:

Measuring the distance to other objects (e.g., effective range can be set between 0.2 meter to 200 meter from relatively adjacent objects to relatively distant objects);

Real time data analysis time (e.g., about 0.1 seconds);

Attaining the 3D information while the system is moving (e.g., the vehicle is driving) and the scene includes static and dynamic objects that might travel at relatively high velocities (e.g., up to 150 km/h);

Detecting obstacles in different sizes, the size may vary from relatively small to large obstacles (e.g., cats, stones, fences, trucks, etc.); and The system is configured to provide accurate information for different types of paths or roads, such as non-flat roads, unpaved roads, etc., as well as to work under various light conditions like daylight, night, rain, fog, snow, etc.

The system of the present invention is based on a module that fuses 3D low resolution image with stereoscopy image by using image processing algorithms and uses the advantages of each method to create an enhanced 3D model for autonomous vehicles or other robotic mechanisms. According to an embodiment of the present invention, the system uses a combination of stereoscopy and 3DLR techniques. The system utilizes 3DLR and stereoscopy as complementary methods to achieve better 3D imaging in real-time calculations.

Generally, 3DLR technology acquires low resolution 3D images with a relatively limited amount of pixels in the field of view. Because of the limited amount of pixels, small and narrow objects like fences, traffic signs, birds, etc. might not be identified as a result of being in between the sparse pixels. On the other hand, stereoscopy technology, using high resolution cameras, can detect small and narrow objects and is able to calculate the distance to those objects. However, the weakness of stereoscopy is the amount of computation required and the necessity of features that must be identified uniquely on both perspectives. This implies limitations in measuring the distance to large, non-featured surfaces and objects. The system of the present invention combines these two methods in such a way that it fuses the advantages of the 3DLR technology with those of the stereoscopy as follows:
- interpolating the distance to relatively large objects from the 3DLR and the stereoscopy results around them; and
- attaining the distance to relatively small objects by the stereoscopic technique.

According to an embodiment of the present invention, the system performs the following main tasks:
- creating an array or matrix of TOF measurements from the 3DLR;
- performing real time stereoscopy; and
- combining the 3DLR and the stereoscopy data in order to create an accurate high resolution 3D model.

Create an array or matrix of TOF measurements: The existing technology today is scanning and doing TOF measurements in different directions (i.e., 3D range finder) in order to build 3D image from single points. Numerous types of laser range finders exist today (e.g. SICK Laser Measurement Sensor (LMS) 200 of SICK AG, HDL-64E LiDAR sensor by Velodyne, laser scanners by RIEGL Laser Measurement Systems GmbH, etc.) which, according to some embodiments of the present can be used as 3DLR in order to create such an array or matrix of TOF measurements. Such devices are able to give 3D range image using laser and a scanning system.

According to another embodiment of the present invention, creating an array or matrix of TOF measurements requires a 3DLR module with non-moving parts (e.g., a TOF camera without moving parts). This can be done by a laser beam which will be directed to the selected directions. Then the system can collect the reflected light using a camera that will be built using the detectors (array of Avalanche/pin photo diodes) and the required lenses that will direct the reflected light to the detectors. In general, creating a 3DLR module with non-moving parts requires: a) building the optics that will direct light beams with different spatial angles to the different parts of a detector array; b) building a detector array/matrix with non-moving parts; and c) extracting the light and synchronizing it with the detector array.

Perform real time stereoscopy: One of the main challenges in stereoscopy is to reduce the amount of computation time required to extract the 3D information. In order to be able to work in real time more efficiently, algorithms with less calculations are required. Since significant amount of the calculation is related to object matching, the system of the present invention provides a simpler mechanism for this task. Alternatively, another way to expedite the calculation is to use the known 3DLR information. According to an embodiment of the present invention, Stereoscopy information will be used only on regions (in the 3DLR image) that the 3DLR module does not able to distinguish (e.g., relatively small regions in the captured field of view which are under the resolution capabilities of the 3DLR module, relatively dark regions which does not emit enough light, etc. and as described with respect to FIGS. 12A-12C later on).

Combining 3DLR and stereoscopy information: Using stereoscopy, the system can acquire the distance information on the edges of the objects and on locations where there are features, at the same time the 3DLR will generate a sparse grid of the distance information.

Referring now to FIG. 1, a system 10 which combines a 3DLR module and a stereovision module, is schematically illustrated according to an embodiment of the present invention. System 10 comprises two high resolution video cameras 1 and 2 (e.g., CCD cameras), a 3DLR module 4 and a processing unit 3. The two high resolution video cameras 1 and 2 are used as the stereovision module and they are positioned with a distance D between them. The 3DLR module 4 can be located in between the two cameras 1 and 2, above one of them, or any other applicable configuration. Preferably, the cameras 1 and 2 and the 3DLR module should be positioned in such a way, that at least partially, they all will be able to capture similar or coincident field of view information. In this embodiment, both the two cameras 1 and 2 and the 3DLR module 4 are located on the same imaginary plane facing the same direction.

For example, the two cameras 1 and 2 can be positioned at two fixed locations. The 3DLR module 4 can be any suitable distance measurement imager unit for generating 3D image, such as TOF module 20 (FIG. 2), the SICK Laser Measurement Sensor (LMS) 200 of SICK AG, ZCam of 3DV, and the like. For example, when using the SICK LMS 200 it can be configured to be directed vertically in angles from 0° to 14° in 0.74° steps. At each vertical step, the scanner acquires one horizontal line with 101 points.

Figure 5:
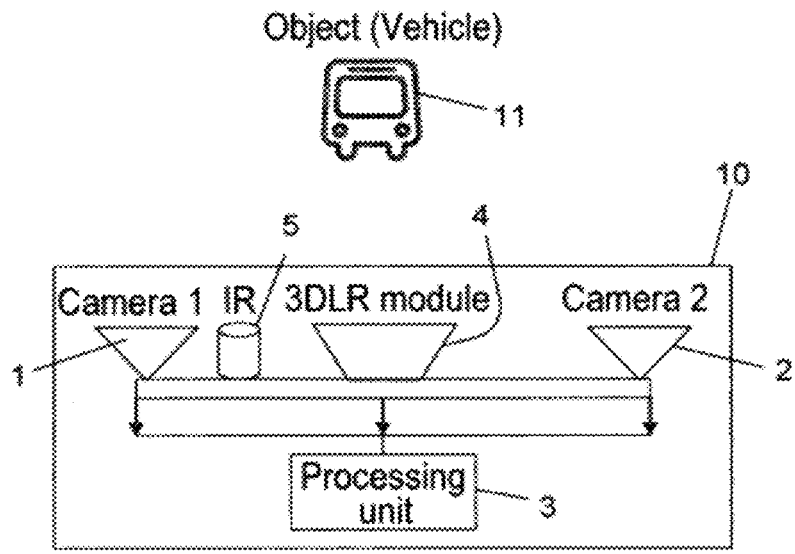
FIG. 5 schematically illustrates a system which combines a TOF module and a stereovision module provided with an IR camera, according to an embodiment of the present invention FIG. 6 schematically illustrates an optic alignment methodology for the matching pixels between the images provided by TOF and the stereovision modules, according to an embodiment of the present invention.

In the prior-art, there are several methods which can be used to calibrate or correlate between 3DLR image and images which are provided with higher resolution (i.e., stereoscopy image). According to this example, an optional IR camera 5 (FIG. 5) can be used to correlate the measurements of the 3DLR module 4 (e.g., the SICK LMS 200) with images provided from the two cameras 1 and 2 (i.e., with the stereoscopic images). Since the IR camera 5 can "see" the laser beam emitted by the 3DLR module 4 (i.e., the emitted light) it can find for each scan line (which provided by the 3DLR module 4) the location on the stereo images. In some cases, the IR camera 5 can be provided with filters which will allow only the IR light to enter in order to better detect the IR light (especially in areas with relatively strong daylight). In this embodiment of FIG. 5, the cameras 1 and 2 and the 3DLR module are positioned in such a way, that at least partially, they all will be able to capture similar or coincident field of view information, such as a vehicle 11.

For example, the setup of system 10 can be configured as follows: left and right stereo cameras 1 and 2 with a distance of 80 cm between them (D=80 cm). The 3DLR module 4 can be placed 22 cm from the left camera 1 and 16 cm above the stereo cameras axis. The optional IR camera 5 can be placed in between the two cameras 1 and 2 and 44 cm above the stereo cameras axis.

Figure 6:
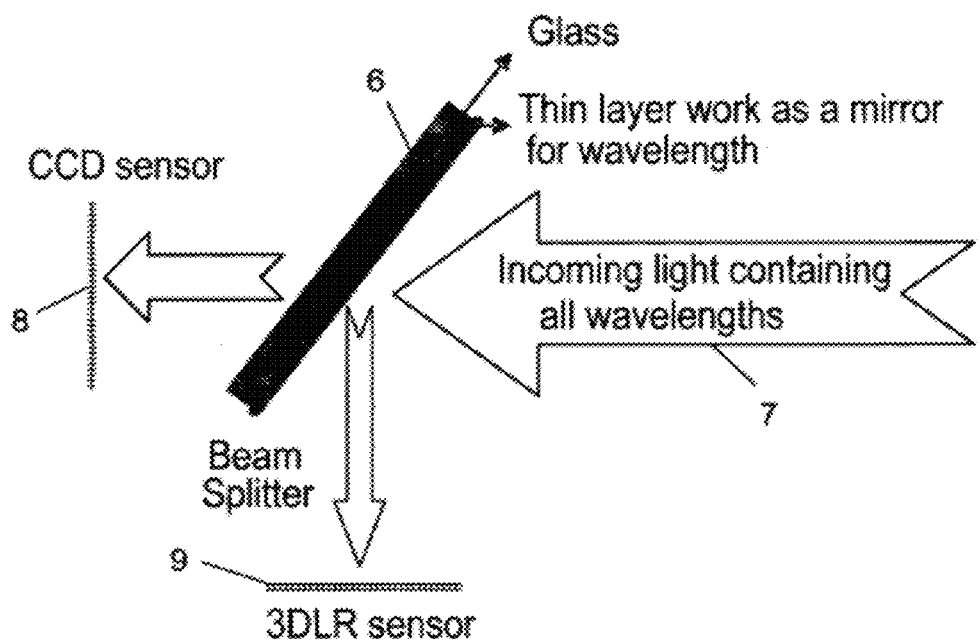

Referring now to FIG. 6, according to an embodiment of the present invention, optic alignment means 6 enables the system to match pixels between the images provided from the 3DLR module 4 (refers herein as a TOF image) and the sensors (e.g., CCD sensor 8) of the cameras 1 and 2 (refers herein as a RGB image). The methodology presented in FIG. 6 makes it possible to separate the incoming light (indicated by numeral 7) into its different wavelengths. The light in the wavelength required for distance measurement will be sent to the sensor 9 of the 3DLR module 4 and the rest of the light will be sent to the CCD sensor 8. Separation of the light can be done using any suitable optic alignment means such as beam splitter (e.g., 770DCXR or 41037 Li-Cor for IR Dye 800 both of Chroma Technology Corp). For example, the 3DLR sensor 9 needs the specific wavelength emitted from the emitter, such as 1.5 micron.

As a result, by aligning the CCD pixels (i.e., the pixels of the image provided by one of the cameras 1 or 2) to the 3DLR pixels (i.e., the pixels of the 3D image provided by the 3DLR module 4), the system can use the image (provided by the CCD pixels) to improve the resolution of the 3DLR image using different types of image processing algorithms. Since the resolution of the CCD sensor 8 is higher then the resolution of the 3DLR module 4, the system 10 can extrapolate the CCD information with 3DLR information to increase the 3DLR resolution. For example, if only a few 3DLR pixels represent an object (e.g., only four pixels, as indicated by numerals 101-104, represent a vehicle 100 as shown with respect to FIG. 11) the system 10 can use the CCD information (wherein the same vehicle 100 is represented by far more pixels) and analyze the object boundary to extrapolate that this entire object has the same distance.

For example, a solution for such extrapolation can be obtained in a manner similar to the method disclosed in the article "Combined use of TOF sensors and standard cameras for 3D video acquisition" C. Dal Mutto et al., In Proceedings of STreaming Day 2009, Genova, Italy, September 2009. However, the suggested method in this article lacks handling situations where the identified areas (usually after performing a segmentation process on the original RGB image, as will be described hereinafter with further details) are relatively small with respect to the resolution of the 3DLR image, or in cases where the 3DLR image "misses" objects in the field of view (e.g., a streetlight pole 110 as shown with respect to FIGS. 12A-12C and as described in further details hereinafter with respect to those Figures) due to its low resolution image capturing capabilities.

Figure 2:
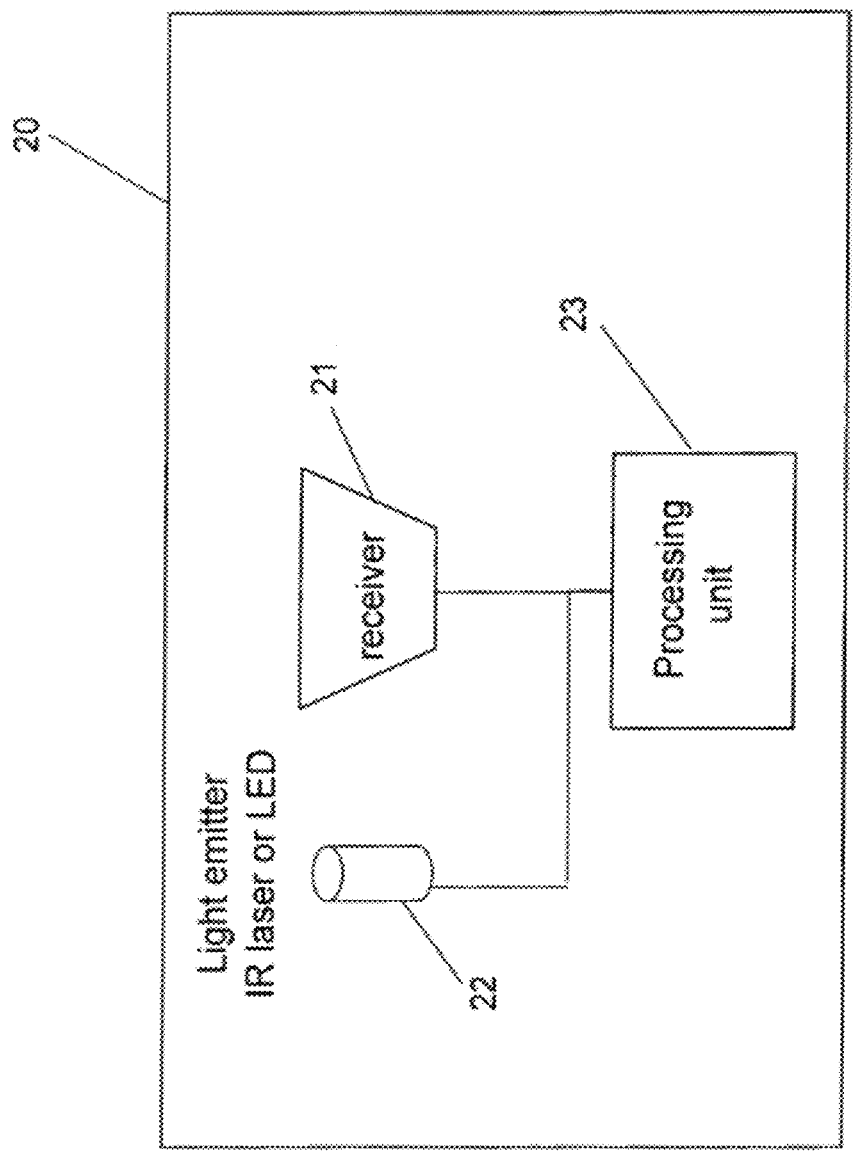
FIG. 2-4 schematically illustrate a TOF module, according to an embodiment of the present invention.
Figure 3:
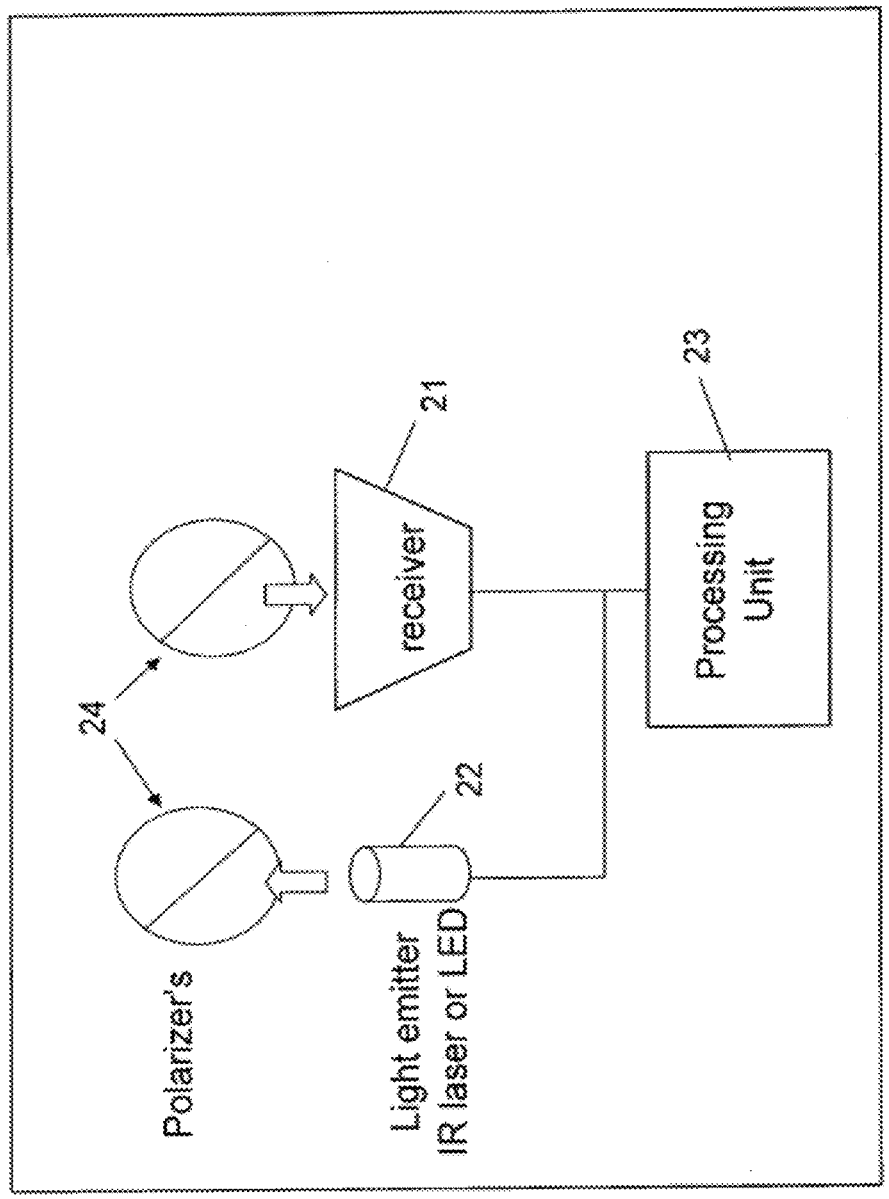

According to an embodiment of the present invention, the system 10 utilizes a 3DLR in form of a TOF module with non-moving parts (i.e., a scanner-less Laser Detection and Ranging device) which is used for providing the 3D image. FIG. 2 schematically illustrates such an innovative TOF module 20 which comprises a receiver 21, a light emitting unit 22 (e.g., IR laser or LED and the like) and a processing unit 23. FIG. 3 schematically illustrates TOF module 20 provided with polarizer units 24, according to an embodiment of the present invention. The polarizer units 24 can be used to avoid crosstalk between vehicles coming from the opposite directions, as will be described with further details hereinafter.

Figure 4:
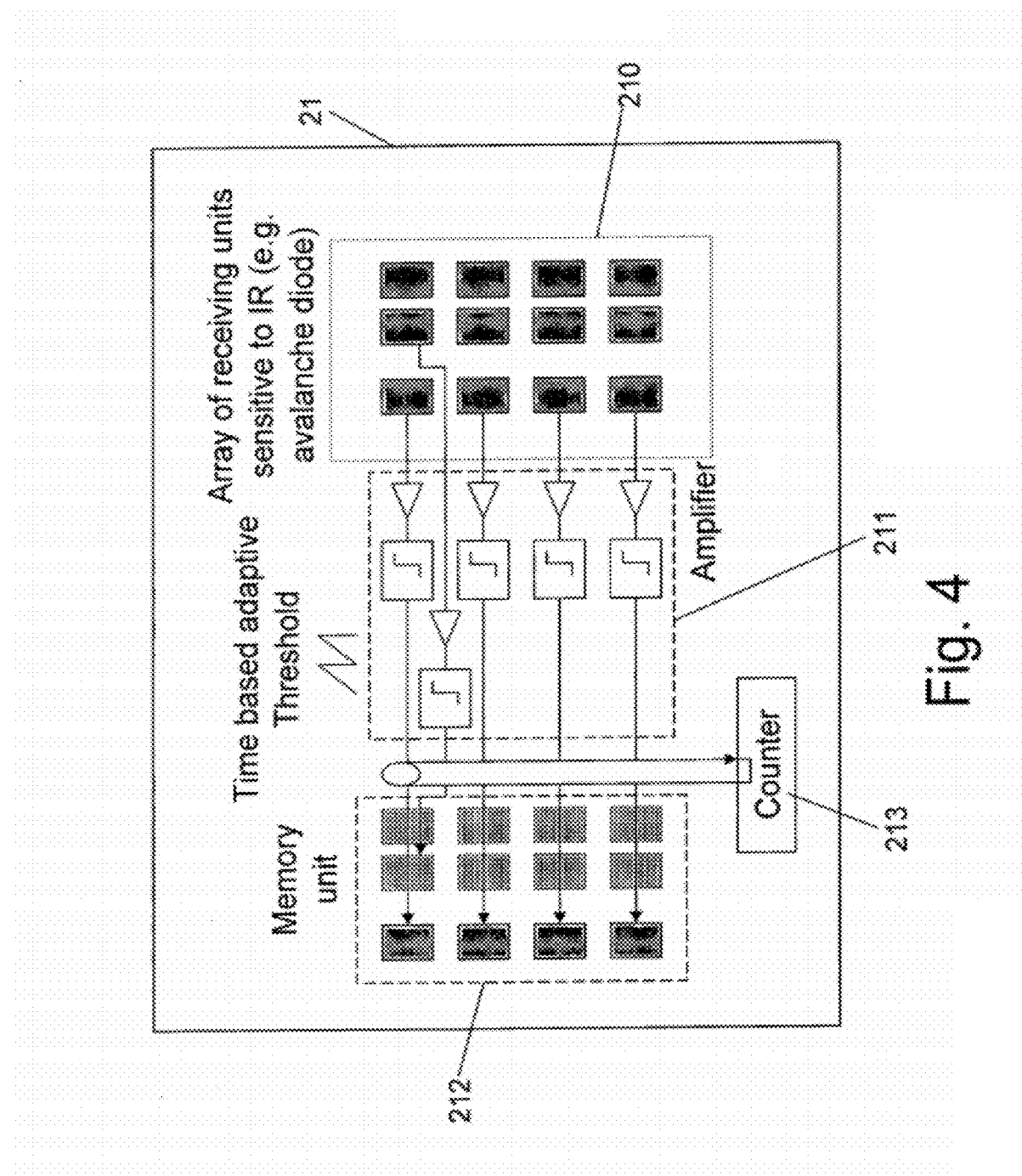

FIG. 4 schematically illustrates the configuration of receiver 21, according to an embodiment of the present invention. Receiver 21 comprises an array of receiving units 210 sensitive to light or to IR (e.g. avalanche diode, PMD chip sensors of PMDTechnologies GmbH, etc.), threshold circuit 211, memory unit 212 and at least one counter 213.

Receiver 21 operates as follows: the counter 213 starts to operate each time the light emitting unit 22 (e.g., an IR laser) sends a pulse. When the reflected light (e.g., IR light) returns to one of the receiving units 210 and the amount of energy received indicates that it is the return light (e.g., IR light) from the light emitting unit 22 (i.e., it passes the current threshold level as dynamically determined by threshold circuit 211), then the counting value (which represents the time elapsed since the pulse was sent) is obtained from the counter 213. The counting value (i.e., the recorded time) is written in the memory unit 212.

According to an embodiment of the present invention, in order to overcome reading load problem due to timing conflict (as may occur when several reflected light waves return at the same time to the receiver 21, e.g., in case they return from the same distance) it is possible to put more counters and to associate each group of pixels with a different counter. Generally, the pixels that are associated with the same counter, should not be adjacent in the 3DLR image, as nearby pixels have more likelihood of being at the same distance. The following table 1 demonstrates an example of storing information while using 4 counters for 100 pixels:

TABLE 1

| C1 | C2 | C1 | C2 | C1 | C2 | C1 | C2 | C1 | C2 |
| --- | --- | --- | --- | --- | --- | --- | --- | --- | --- |
| C3 | C4 | C3 | C4 | C3 | C4 | C3 | C4 | C3 | C4 |
| C1 | C2 | C1 | C2 | C1 | C2 | C1 | C2 | C1 | C2 |
| C3 | C4 | C3 | C4 | C3 | C4 | C3 | C4 | C3 | C4 |
| C1 | C2 | C1 | C2 | C1 | C2 | C1 | C2 | C1 | C2 |
| C3 | C4 | C3 | C4 | C3 | C4 | C3 | C4 | C3 | C4 |
| C1 | C2 | C1 | C2 | C1 | C2 | C1 | C2 | C1 | C2 |
| C3 | C4 | C3 | C4 | C3 | C4 | C3 | C4 | C3 | C4 |
| C1 | C2 | C1 | C2 | C1 | C2 | C1 | C2 | C1 | C2 |
| C3 | C4 | C3 | C4 | C3 | C4 | C3 | C4 | C3 | C4 |

Wherein C1 represents the first counter, C2 represents the second counter, C3 represents the third counter and C4 represents the fourth counter. Each cell in the table represents a pixel value from one of the four counters. The entire pixels in table 1 represent a captured 3DLR image (i.e., frame or subframe as will be described in further detail with respect to FIG. 8 hereinafter), and as it can be easily seen in that table, the information for adjacent pixels are provided from different counters. This is done according to timing conflict as described hereinabove.

In this embodiment, the threshold level is dynamic and is change in time, assuming that when more time has elapsed since the pulse was sent, then the object from which the return light is reflected from, is relatively positioned far from the receiver 21 (i.e., from the system of the present invention). When the object is relatively far, then less light is comes back in the ratio of $1/r^2$.

The amplitude of the reflected light decreases as the distance it measures increases. According to an embodiment of the present invention, the system can increase the sensitivity of the detection unit when it measures distance to objects that are at a relatively large distance, and decreases the sensitivity when it measures the distance to objects that are in close proximity. Alternatively, in case of photo diode, the system can change the photo diode reverse bias in time in such a way that when the sensitivity is increased (i.e., the voltage is increased) there is more noise. As a result of that the measurements accuracy might be decreased when the system measures distance to objects at a large distance. However, this is acceptable since it is preferred for the system to be more accurate when a car is relatively close to the vehicle carrying the system, but the system can lose some accuracy if the car is relatively far from it.

For example, the hardware components, configuration and parameters for the system of the present invention with the suggested embodiment of TOF module 20 can be set as follows:

Light emitting unit 22—a laser from fiber coupled semiconductor diode (e.g., 10 to 30 watts);

Receiver 21—Focal Plan Array Si-APD, 5×5 to 8×8 elements, up to 3 arrays of PMDTechnologies GmbH;

Combining Receiving, Laser and CCD—3 separate channels;

Optics—conventional+IR narrow band Filter for Receiver; Laser controller;

Receiver board+Ladar Logic card; and

Processing—a computing unit for Ladar, Image processing and fusion, such as a dedicated computer or a dedicated ASIC which are confined to performing specific image processing functions for reasons of efficiency or convenience.

According to an embodiment of the present invention, in order to acquire the distance from an object, each pixel uses two subunits: a sensing unit (e.g., receiving units 210 of FIG. 4) and a detection unit (e.g., threshold circuit 211, memory unit 212 and counter 213 of FIG. 4). The sensing unit contains the light sensor (e.g. avalanche diode) and may also contain all the elements that can not be shared and must be connected to the light sensor directly. The detection unit contains the relatively expensive elements that can be shared (counter, comparator, etc.).

The sensing unit will be activated/switched based on which pixels are functioning. Each captured 3DLR image is divided into sub-frames, wherein each sub-frame is built from small frame-patches that are composed together to create the complete sub-frame. In order to reduce noise, each sequence of sub-frames is processed by a noise reduction filter such as average or median filter.

Figure 8:
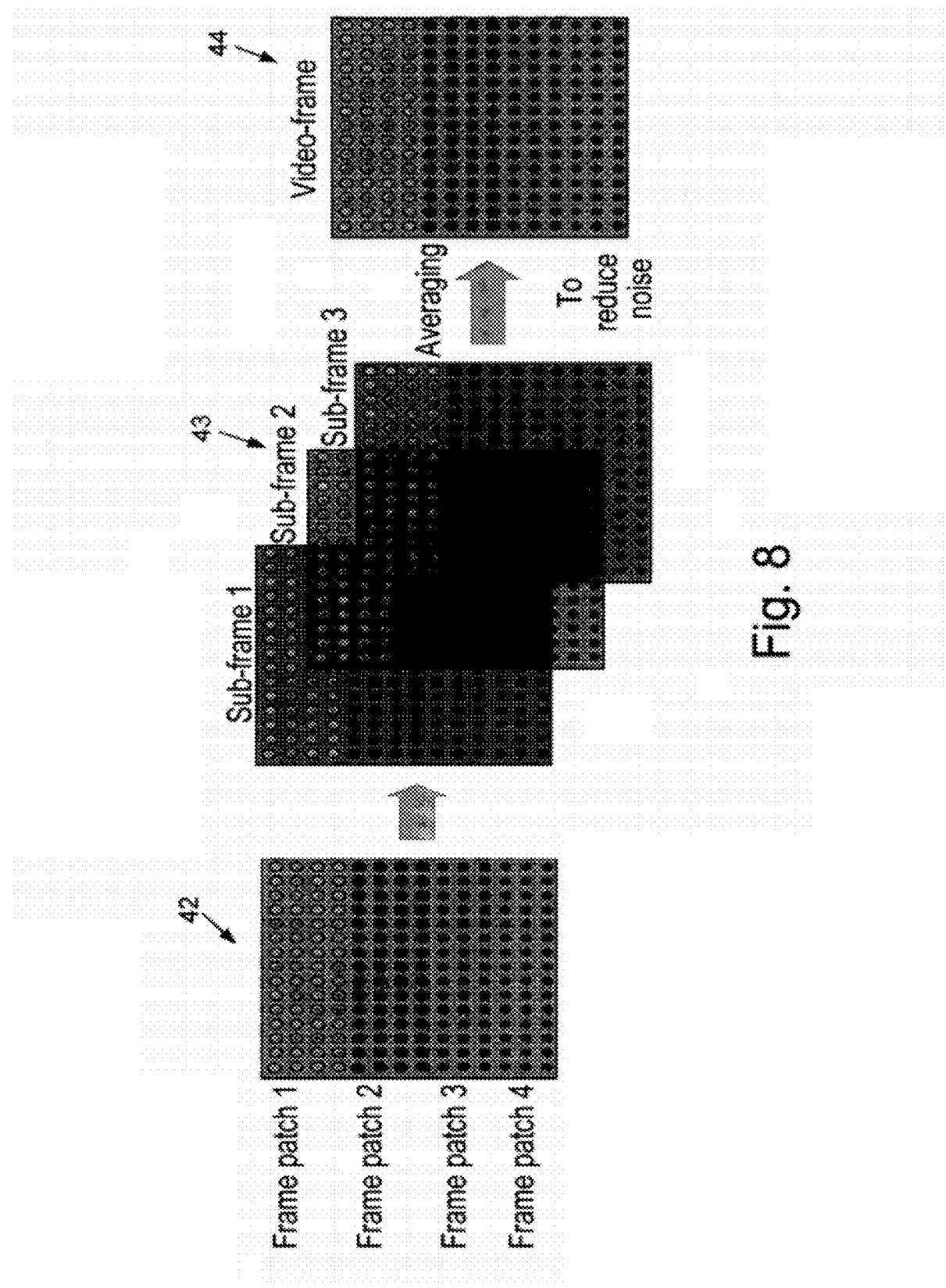
FIG. 8 schematically illustrates the video frames, according to an embodiment of the present invention.

Referring now to FIG. 8, a frame structure is shown, according to an embodiment of the present invention. In this embodiment, the time between the video frames is used for performing the following steps (as shown with respect to FIG. 8):

1. creating the "Frame patches" 42 (e.g., frame patches 1-4);
2. putting the created Frame patches together into "Sub-frames" 43; and
3. creating a "Video-frame" 44 from the different Sub-frames.

This can be done according to the following example (Table 2):

TABLE 2

| Light speed | C | m/sec | 3.00E+08 |
|---|---|---|---|
| Max distance | maxDist | m | 2.00E+02 |
| Peek wide | peekW | sec | 1.00E−09 |
| Number of pixels | pixelN | | 1.00E+02 |
| Number of counters | countersN | | 4 |
| Frame per sec | frameRate | Hz | 100 |
| Number of pixels per counter | pixelN/countersN | | 25 |
| Time Per max dist measurement | (2*maxDist)/C | sec | 1.33E−06 |
| Number of measurements possible between frames | (1/FrameRate)/[(2*maxDist)/C] | | 7.50E+03 |
| Number of sub-frames available for averaging | (1/FrameRate)/[(2*maxDist)/C]/[pixelN/countersN] | | 3.00E+02 |

Wherein, for example, the arrival time of pulses can be achieved by using one or more counters (as described hereinabove), integration of the pixel energy, un-sampling of the sensor (i.e., the array of receiving units, such as photodiode) at predetermined or random intervals, etc.

Preventing Crosstalk

In case many 3DLR devices operate simultaneously (e.g., from different vehicles on the road), then it is required to prevent crosstalk between these 3DLR devices, as the crosstalk may cause fault range results. According to an embodiment of the present invention, using a polarizer can avoid crosstalk between vehicles coming from opposite directions. This kind of crosstalk is the most problematic one since it has high amplitude because the vehicles face each other. By using an emitter with polarization of 45 degrees and polarization filter with 45 degrees, the vehicle will be able to receive the reflected light generated by its own emitter, and at the same time, to filter the light emitted from the vehicles driving in the opposite direction.

According to another embodiment of the present invention, using few sub-frames can be used to prevent such crosstalk. This can be done since the system is able to generate several sub-frames, thus crosstalk can be removed by discarding certain layers from the image frame by averaging the image (with average filter) or by using a median filter to create the frame.

Real-Time Solution for Stereoscopy

The correspondence problem (i.e., pattern matching) is one of the main problems in stereovision. The two main limitations are: a) the amount of calculation required to do the matching and its complexity; and b) dealing with regions without defined patterns, which in some cases introduce errors that impact the whole depth map.

When a set of objects is acquired by the cameras 1 and 2 from two different locations, the images look different even if the images contain the same objects. In the image plane, each object and the distance between the objects will be different as a result of the projection from a different angle. Correlating between the two images allows calculating a depth map (i.e., a 3D correlation map between the RGB images provided from camera 1 and camera 2). In general, template matching is a technique in digital image processing for finding small parts of an image which match a template image (i.e., a process used for finding incidences of a pattern or object within an image). It can be used in manufacturing as a part of quality control, a way to navigate a mobile robot, an autonomous vehicle or as a way to detect edges in images. Wherein, normalized correlation is one of the methods used for template matching.

Although there are many types of matching algorithms that are used in order to obtain stereo vision information (e.g. as disclosed in the articles "An introduction to 3D computervision techniques and algorithms" by Boguslaw Cyganek, and J. Paul Siebert, and in "Multiple view geometry in computer vision" by Richard Hartley, and Andrew Zisserman). However, none of the known methods is able to work in real-time as the stereo vision processing is intensive and therefore it usually takes a relatively long period time with respect to real-time demands.

The following section describes a novel matching algorithm (for providing stereo vision information) that is able to work in real time, according to an embodiment of the present invention. The correlation between the HR images is done by the novel matching algorithm which works both locally and globally on the images data.

Real-Time Matching Algorithm

In the following section a matching algorithm according to an embodiment of the present invention, is described. The proposed matching algorithm is called herein a Binary Templates Fusion (BTF) algorithm. The BTF algorithm is used to resolve the aforementioned correspondence problem in runtime. The BTF uses many small templates and can work locally using only locations that contain information in the images. After each template is working locally, it combines the correlation results in order to attain the global matching solution (similar to algorithm disclosed by J. Y. Bouguet, "Pyramidal implementation of the Lucas Kanade feature tracker: description of the algorithm", Technical report, OpenCV Document, Intel Microprocessor Research Labs, 1999). This enables the system of the present invention to achieve a global minimum for all the templates on both images. The BTF utilizes a new mathematical formulation that enables Binary Normalized Correlation (BNC). The BTF employs small binary templates and a new methodology to combine templates using multiplication in the correlation domain.

The BTF has the following advantages:

It uses the information where features exist. This saves calculation time and increases SNR;

It enables solving large and small scales together (i.e., small and large objects). This allows performing the matching even in cases where the pictures in the different perspectives appear differently; and It reduces the amount of calculation time required and enables stereoscopy in real time.

Binary Normalized Correlation (BNC)

The BNC is the mathematical formulation of normalized correlation applied to binary information. Using the BNC equations and the assumption of binary images, the following equation of binary correlation is provided:

Normalized Cross Correlation (NCC):

$$C_{xy} = \frac{\sum(x-\bar{x})(y-\bar{y})}{\sqrt{\sum(x-\bar{x})^2 \sum(y-\bar{y})^2}} =$$

$$C_{xy} = \frac{\sum(xy - \bar{x}y - \bar{y}x + \overline{xy})}{\sqrt{\sum(xx - 2\bar{x}x + \overline{xx})^2 \sum(yy - 2\bar{y}y + \overline{yy})^2}} =$$

$$C_{xy} = = \frac{N_{ov} - \frac{N_x}{A}N_y - \frac{N_y}{A}N_x + \frac{N_x}{A}\frac{N_y}{A}A}{\sqrt{\left(N_x - 2\frac{N_x}{A}N_x + \frac{N_x}{A}\frac{N_x}{A}A\right)\left(N_y - 2\frac{N_y}{A}N_y + \frac{N_y}{A}\frac{N_y}{A}A\right)}}$$

Multiply by A/A $$C_{xy} = \frac{AN_{ov} - N_x N_y - N_y N_x + N_x N_y}{\sqrt{(AN_x - 2N_x N_x + N_x N_x)(AN_y - 2N_y N_y + N_y N_y)}}$$

$$= \frac{AN_{ov} - N_x N_y}{\sqrt{(AN_x - N_x N_x)(AN_y - N_y N_y)}}$$

$$C_{xy} = \frac{N_{ov} \cdot A - N_x \cdot N_y}{\sqrt{N_x \cdot N_y \cdot (A - N_x) \cdot (A - N_y)}}$$

This correlation reduces significantly the amount of calculation required by not having to sum multiplications and by using smaller data structures (1 bit instead of 8 bit).

Normalized Cross Correlation (NCC):

$$C_{xy} = \frac{\sum(x-\bar{x})(y-\bar{y})}{\sqrt{\sum(x-\bar{x})^2 \sum(y-\bar{y})^2}}, \bar{x} = \frac{x}{N}, \bar{y} = \frac{y}{N}$$

The NCC for black and white images can be developed into BNC as follows:

$$C_{xy} = \frac{N_{ov} \cdot A - N_x \cdot N_y}{\sqrt{N_x \cdot N_y \cdot (A - N_x) \cdot (A - N_y)}}$$

where
$N_x$—Number of non-zero pixels in x
$N_y$—Number of non-zero pixels in y
$N_{ov}$—Number of overlapping non-zero pixels
A—Template area The limitation of Binary Normalized Correlation (BNC) lies in its registration accuracy. Therefore the Binary Normalized Correlation is used only for feature matching; however the calculation for the exact sub-pixel registration is done by regular correlation when the system interpolate in the correlation domain.

Combining Templates

In order to be able to move from local template matching to a more global view, combining the correlation of two or more templates is required. The mechanism to combine two or more templates is based on the following equation:

$$C_{(x1 \oplus x2)y} \cong C_{x1y} \cdot C_{x2y}$$

where x1, x2 are two feature templates and Cx1y, Cx2y are two correlation images.

Figure 9:
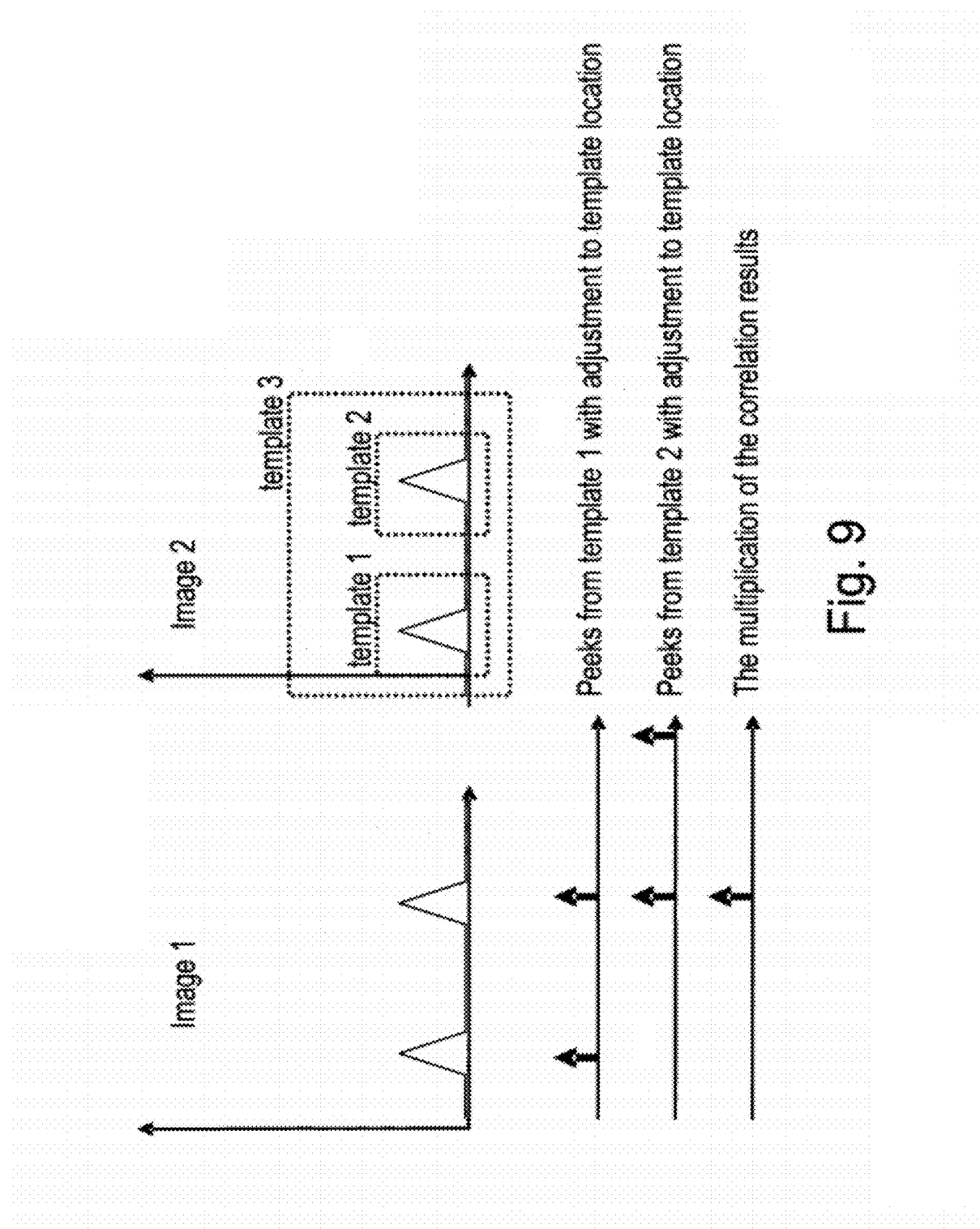
FIG. 9 shows combining templates graphs for matching TOF and stereoscopic images, according to an embodiment of the present invention.

The normalized correlation result is a map with values between 0 and 1. By multiplying the normalized correlation results from two templates, the result will be again a number between 1 and 0. When templates are combined the result will be 1 only if the two combined templates match and it will be a number close to 0 if they do not match. This process enables the system to correct the template location. Multiplication of two normalized cross-correlation maps results also in a map with values between 0 and 1. This result is close to 1 if two combined templates were perfectly matched and their stereo displacement was equal, but would be close to 0 if the templates did not match. For example, with respect to FIG. 9, if we use Template 1 from Image 2, we will get two peaks in the correlation space. If we use Template 2, we will also get two peaks. However, if we multiply the results in the correlation space, we will get only one peak. This result will be the same if we use Template 3. Wherein:

One peak identifies a unique matching of the template;

No peak results in matching failure (the template location should be omitted from the 3D correlation map); and More than one peak is detected. The template is labeled as "suspected to be repetitive".

In some cases, if we combine templates that are in different distances as a result of the different perspectives, the distance between the same two templates on the other perspective will be different. Thus we might decide to dilate the correlation images $C_{x1y}$ and $C_{x2y}$ prior to multiplying $C_{x1y} * C_{x2y}$.

Multiple Templates Matching

Figure 10:
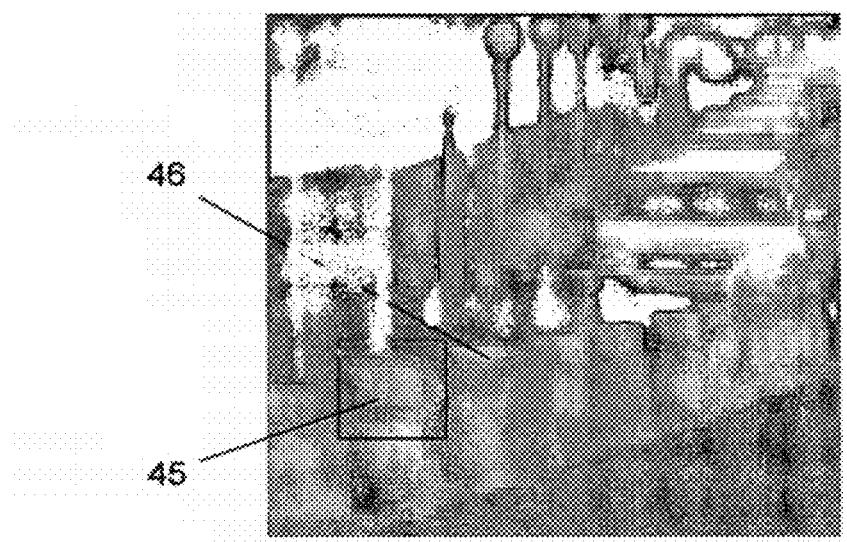
FIG. 10 shows a scene with repetitive objects.

In order to estimate the distance to an object using stereo vision, the object needs to be identified in both stereo perspectives. In many cases features are repetitive. When a repetitive object exists in one perspective (i.e., in the image taken from camera 1), it might have several matching objects on the other perspective (i.e., in the corresponding image taken from camera 2). As a result, a wrong object might be selected and the 3D result will be deformed. In order to avoid this deformation, the system of the present invention recognizes repetitive objects and takes them into consideration when performing the matching. FIG. 10 shows an image with repetitive features as indicated by numerals 45 and 46.

The proposed method recognizes the repetitive object by using internal correlation, according to the following steps:
1. Taking the feature template of perspective one and correlating it with the image of perspective two;
2. If there is only one significant peak, the matching is completed, go to END. If there is more than one significant peak in the correlation image, then there is repetition;
3. In cases of repetition, correlate the template of perspective one with the image of perspective one around the location where it should appear (this can be calculated according to the location of the peak in step 1); and
4. If another peak is found, the repetitive feature from perspective one should be added to the template and go to step 1. If not, use the biggest peak (or reserve few candidates for the template) and do the matching for the templates (the first and the second).

Correlation Maximum Searching Distance

The correlation maximum searching distance is an important parameter in the amount of calculation required and the probability of errors to occur. If we know the limitation for the correlation distance, we can increase performance and reduce error by limiting the correlation searching distance. This information can be calculated using the TOF information.

The Fusion Process

Figure 7:
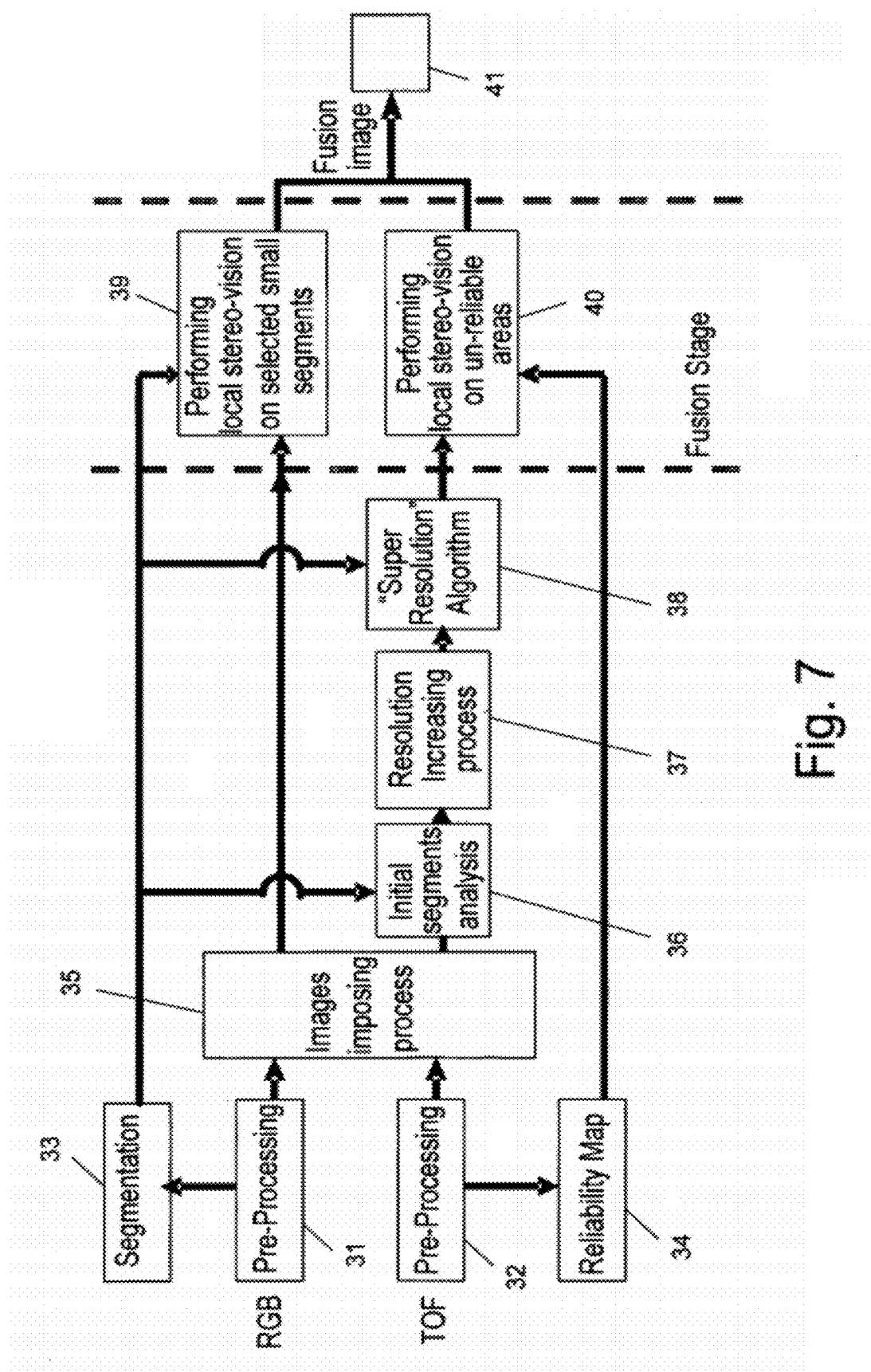
FIG. 7 schematically illustrates the method for providing 3D imaging, according to an embodiment of the present invention.

Referring now to FIG. 7, a schematic illustration of the method of the present invention for providing 3D imaging is shown in a flowchart form. At first, a pre-processing stage is being performed on the images (blocks 31 and 32). Pre-processing the images (3DLR and RGB) is performed, using any suitable digital filtering techniques, in order to perform some kind of noise reduction on the images (e.g., median filter).

Figure 12A:
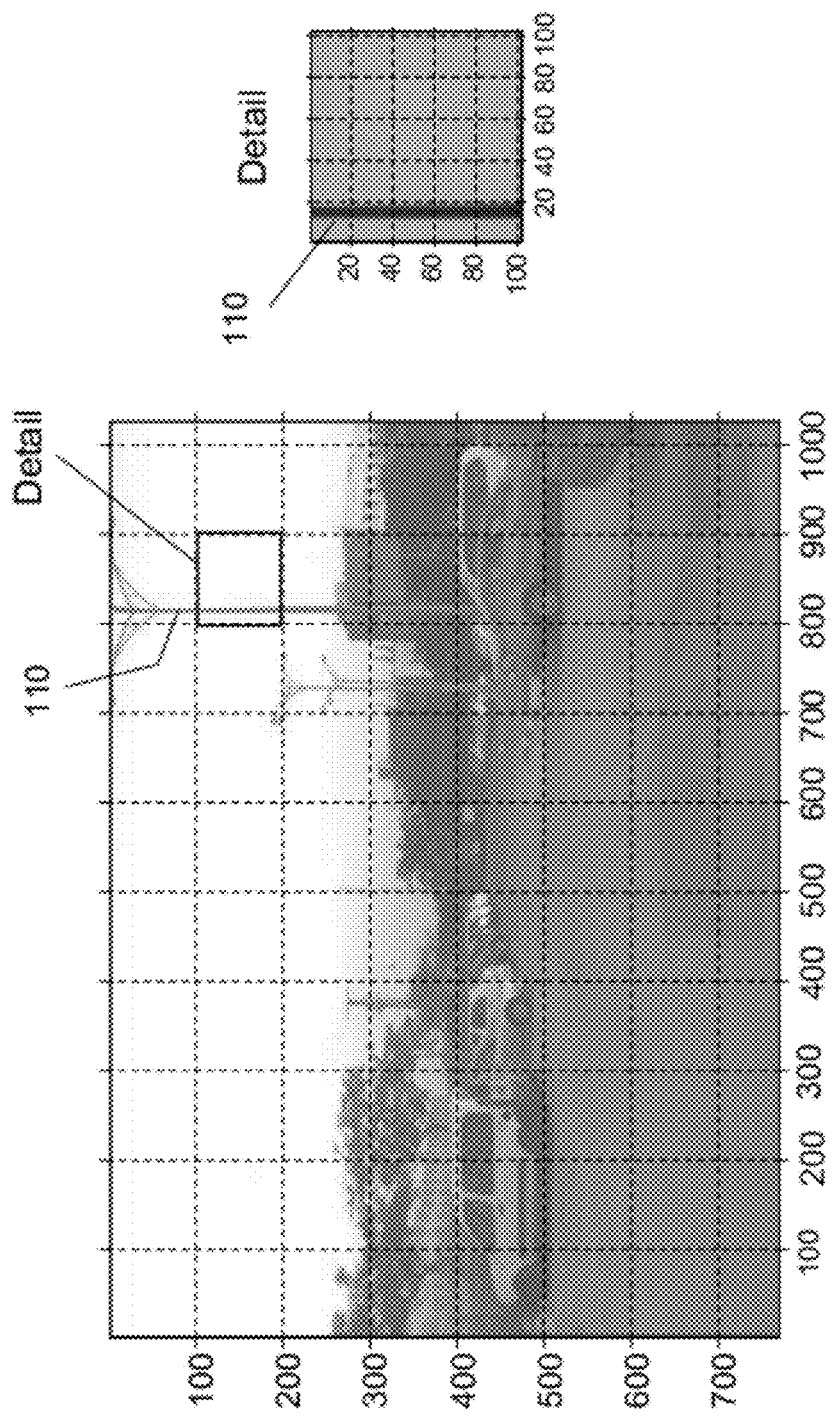
FIG. 12A represents a high resolution image of a given scene.
Figure 12B:
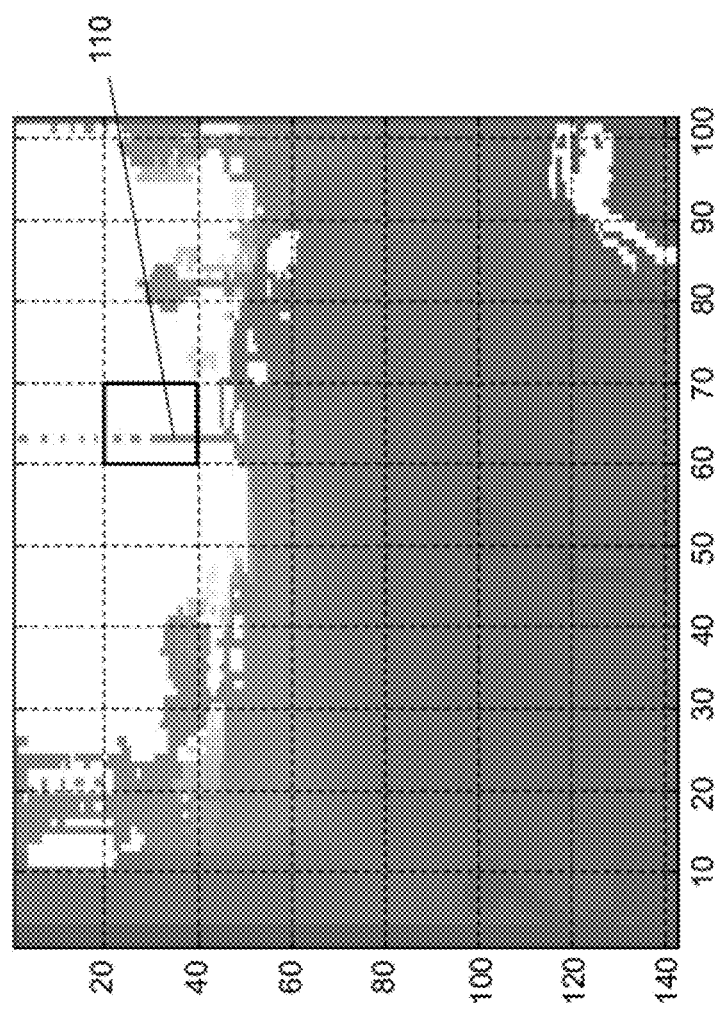
FIG. 12B represents a low resolution image of the same given scene of FIG. 12A.
Figure 12C:
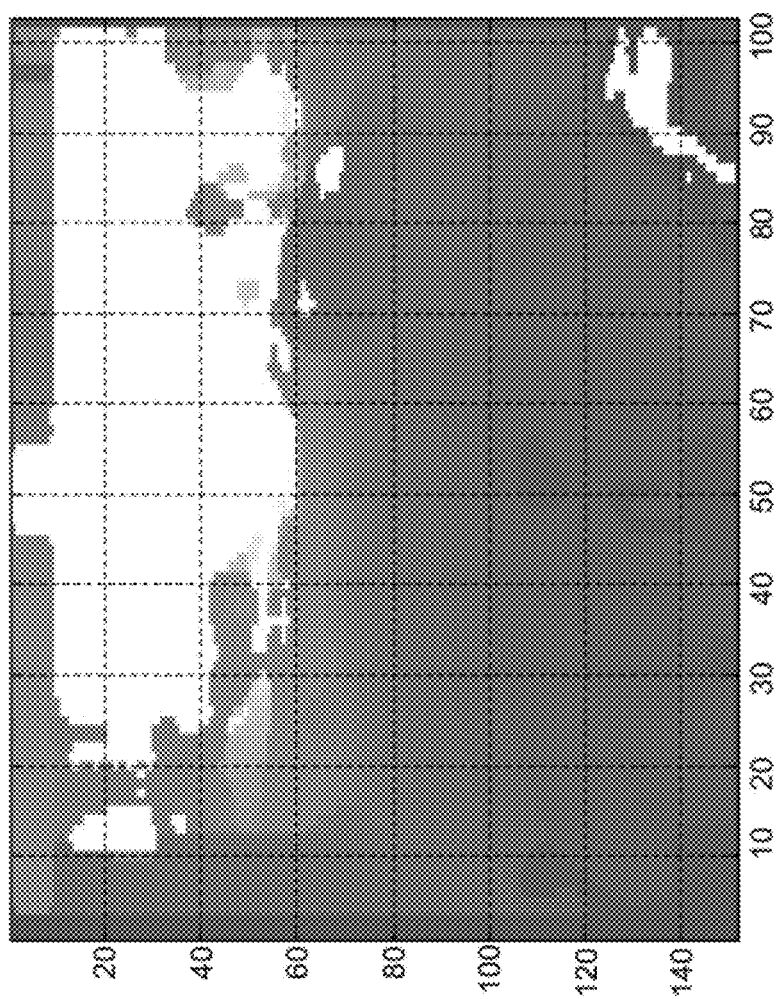
FIG. 12C represents the low resolution image of FIG. 12B after being processed with median filter.

However, this pre-processing stage is problematic in some cases, as described for example, with respect to FIGS. 12A-12C. FIGS. 12A-12C represents three different presentations of the same field of view (i.e., a specific given scene). FIG. 12A is a High Resolution Image (HR image) of that given scene which reflects an image taken by a high resolution camera (e.g., camera 1). FIG. 12B is a low resolution image of the same given scene which reflects an image taken by a 3DLR module (e.g., TOF module 20). FIG. 12C represents the low resolution image of FIG. 12B after being processed by a median filter. As it can be seen in FIG. 12A, the streetlight pole 110 (in a specific region) is defined by 5-7 pixels. For example, in case the ratio between the pixels in the 3DLR image and the HR image is at least 5 (i.e., each pixel in the 3DLR image represented by at least 5 pixels in the HR image), then when providing a median filter on the 3DLR image, the streetlight pole 110 may disappear from the image (as occurs in FIG. 12C).

The system and method suggested by the present invention overcome such problems by applying stereo vision algorithms (in order to obtain distance information) only on relatively small segments found in the HR image. Therefore in such cases, the distance information for such small segments is acquired from the stereo vision and not forms the 3DLR image, as stereo vision is usually much useful in finding the distance to small features or objects in stereoscopy image. Thereby eliminating the need to apply stereo vision image processing algorithms (e.g., matching algorithm) on the entire HR images.

At the next step (block 33 in the RGB channel), partitioning one of the RGB images (e.g., the left RGB image) into multiple segments (i.e., segmentation) in order to: 1) locate relatively small surfaces (which might be not detected in the 3DLR image); and 2) locate relatively large surfaces.

According to an embodiment of the present invention, small surfaces will be set using a threshold value determined by the ratio between the resolution of the 3DLR module 4 and that of the RGB camera 1; this can be concluded about the minimum object size that can be revealed by the 3DLR module 4. Wherein the relatively large surface will be used for:
the initial processing of the 3DLR image (block 36), to match the type of interpolation that the system will perform in any area in the 3DLR image, for increasing the resolution of the 3DLR image (block 37);
the fusion stage (block 38), to perform a "Super-Resolution" algorithm which aimed for improving the resulting of the fusion image.

Therefore, a segment whose dimensions are smaller than the determined threshold value, will be identified as "small surface" which may be missed by the 3DLR module 4.

The raw data that is obtained from the 3DLR module 4 is relatively low resolution information which includes: 1. depth map—includes the distance value of each pixel; and 2. intensity image (i.e., amplitude image) —includes the reflected light intensity values for each pixel.

At the next step (block 34 in the 3DLR image processing channel) —building a reliability map that will be use later at the fusion stage (block 40). The reliability map is used as the reliability index of each pixel in the 3DLR image. Building a map reliability is disclosed in "Fusion of Stereo-Camera and PMD-Camera Data for Real-Time Suited Precise 3D Environment Reconstruction" by Kuhnert, K.-D.; Stommel, M.; "*Intelligent Robots and Systems*, 2006 *IEEE/RSJ International Conference on*, vol., no., pp. 4780-4785, 9-15 Oct. 2006 and also in "Depth imaging by combining time-of-flight and on-demand stereo" by U. Hahne, M. Alexa, "*Lectur Notes in Computer Science*", Heidelberg, Germany, 2009.

Calibration

The purpose of calibration step (block 35) is performing calibration for each individual camera (i.e., RGB cameras 1 and 2 and the 3DLR module 4) and calibrating the entire system. Products of this process are various parameters that define the characteristics of each camera, and the connections and transitions between coordinate systems of all cameras in the system of the present invention. The calibration process includes calculating all the necessary transformations and the transition parameters for working with three cameras.

Using the results of the calibration process (after every frame), so that system will be able to perform the fusion process, we want to impose the images (from the different sources) on one common coordinates system, using the parameters obtained at the calibration process. This will allow the system to move from any pixel within an image, to the same pixel in the other image. Either, to move between the two RGB images, or to move between the RGB images and the 3DLR image.

At the next step (block 36), using the information received at the segmentation stage (performed earlier on the RGB image) in order to determine the type of interpolation to perform in each region in the 3DLR image. This is used for increasing the resolution of the 3DLR image in selected regions.

After locating and identifying the surfaces, either in the RGB image and in the 3DLR image, the system applies the "super resolution" algorithm (block 38) which aims to improve the resolution around the lack of discontinuities in the image (as for example occurs in FIG. 12C). This algorithm is based on the assumption that the lack of continuity in the "depth map" of the 3DLR image respectively will be associated with color or texture changes in the RGB image.

At this stage, the depth map, is now projected on the segmented RGB image (block 35), the projection creates a type of grid on the RGB image. The method is based on the assumption that the surfaces or objects that were found in the segmentation processing (of the RGB image) will be large enough so that after the projection of the 3DLR image, each of the segments will contain several distance measurements.

This "super resolution" algorithm (block 38) is performed on each of the distance measurements of the 3DLR module which are detected within a particular segment within the RGB image. For each such distance measurement, the value of the neighboring measurements are also examined. If all the neighboring measurements are also within the same segment, then algorithm continue to check the next measurement. In case the neighboring measurements lie outside the segment which has been processed now, then in this case, the edge of the segment will be corrected according to the segment located in the RGB image, and distance measurements of that segment will be adjusted according the distance measurements obtained from the 3DLR image. This can significantly improve the resolution of the surfaces border, and thereby create a more accurate image. An example for such "super-resolution" algorithm is disclosed in "Combined use of TOF sensors and standard cameras for 3D video acquisition" by Carlo Dal Mutto, Valeria Garro, Pietro Zanuttigh, Guido M. C., In Streaming Day 2009. Genova, 21 Sep. 2009.

The next step (blocks 39 and 40), the fusion stage, includes the fusion operation itself, which integrates the stereo image information with the 3DLR information. As a result, the final fusion image is obtained, a relatively high quality 3D image of the environment. Activation of the stereo image will occur on selected regions in the field of view (based on the aforementioned processing of the 3DLR image and the RGB image).

According, to these processing the system can conclude on what areas in the image it is required to activate the stereo image processing.

Small surfaces—Based on the information about the small surfaces, as identified at the initial analysis of the RGB image, the system activates the stereo algorithm on these areas to obtain depth information. Based on the map of reliability, the system uses stereo algorithm over "unreliable" regions in order to obtain new depth information.

Finally, in areas where the system run the stereo image process, we will use a decision algorithm, in order to allow the system to select what information to display in the final fusion image (block 41) (i.e., to determine whether it information that belongs to the 3DLR image or to the stereo image).

The system of the present invention with the proposed algorithms provides a real-time 3D image sensor. This sensor combines TOF and stereoscopy as complementary methods. The system utilizes the low resolution 3D imaging based on 3DLR module which generates a sparse grid of the distance information that expedites the calculation of the common stereoscopic method and completes the stereoscopic method's information on regions without patterns. As a result, using the suggested system, relatively high resolution 3D images can be generated.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

The invention claimed is:

1. A system for providing 3D imaging, comprising:
   a) two or more cameras for allowing to generate stereo images from real time stereoscopic data only for selected regions in a common or coincident field of view captured simultaneously by said two or more cameras, in order to provide distance measurements information to object(s) located in said selected regions;
   b) at least one 3D Low Resolution (3DLR) module for providing a low resolution 3D image by creating an array of Time of Flight (TOF) measurements in different directions from single points based on calculation of time differences between the emitting of a light pulse and a return signal of the light pulse, wherein said two cameras and said 3DLR module are positioned to at least partially capture similar or coincident field of view information; and
   c) a first processing unit for generating a high resolution 3D model by combining said stereoscopic data and said low resolution 3D image, wherein the stereoscopic data is used only on regions in the 3DLR image that the 3DLR module cannot distinguish, thereby reducing the amount of computation time required to extract the 3D information and resulting in accurate 3D imaging information in real-time.

2. A system according to claim 1, further comprising an IR camera for allowing to correlate between the measurements of the 3DLR module with the images provided from the two cameras, wherein the correlation is based on a matching algorithm.

3. A system according to claim 1, in which the 3DLR module is a laser range finder unit configured to provide 3D range image using a laser and a scanning system.

4. A system according to claim 1, in which the 3DLR module comprises a receiver for collecting reflected light, a light emitting unit for directing light beams with different spatial angles to different parts of said receiver and a second processing unit for extracting the light beams and synchronizing them with said receiver, thereby providing a 3DLR module with a TOF module that require non-moving parts.

5. A system according to claim 1, in which the 3DLR module further comprises a polarizer for avoiding crosstalk between vehicles coming from the opposite directions.

6. A system according to claim 1, in which the two cameras and the 3DLR module are located on the same imaginary plane facing the same direction.

7. A system according to claim 1, wherein said two cameras each have a CCD sensor, and said system further comprising optic alignment means for allowing to match pixels between the images provided from the 3DLR module and from the two cameras, by allowing to separate the light into its different wavelengths, so that the wavelengths required for distance measurements will be sent to said 3DLR module and the rest of the wavelengths will be sent to the CCD sensor of each of said two cameras.

8. A system according to claim 7, in which the optic alignment means is a beam splitter.

9. A method for providing 3D imaging, comprising the steps of:
   a) capturing images from at least two cameras for allowing to generate stereo images from real time stereoscopic data for selected regions in a common or coincident field of view which is captured simultaneously by said cameras, in order to provide distance measurements information to object(s) located in said selected regions;
   b) generating low resolution 3D image data by creating an array of Time of Flight (TOF) measurements in different directions from single points using a 3D Low Resolution (3DLR) module, wherein said two cameras and said 3DLR module are positioned to at least partially capture similar or coincident field of view information; and c) generating a high resolution 3D model by combining said stereoscopic data with said low resolution 3D image, wherein the stereoscopic data is used only on regions in the 3DLR image that the 3DLR module cannot distinguish, thereby reducing the amount of computation time required to extract the 3D information and resulting in accurate 3D imaging information in real-time.

10. A method according to claim 9, in which the selected regions are determined by correlating the 3D image data only with the corresponding image captured by one of the cameras, in order to identify regions in said 3D image that the 3DLR module is unable to distinguish in a given field of view.

11. A method according to claim 9, in which the stereoscopic data is generated by correlating between the images provided by the two cameras using a real-time matching algorithm.

12. A method according to claim 9, further comprising correlating between the data provided by the 3DLR module with the stereoscopic data is done by an optic alignment means.

13. A method according to claim 9 further comprising the steps of:

a) creating an array or matrix of TOF measurements using the 3DLR module;

b) performing real time stereoscopy by using a matching algorithm thereby providing stereoscopic data; and c) combining said TOF measurements and said stereoscopic data for creating the high resolution 3D model.

* * * * *